Aug. 1, 1967
R. M. KOSTIN ETAL
3,333,362
CONVERTIBLE BACKLIGHT
Filed Feb. 5, 1965
4 Sheets-Sheet 1
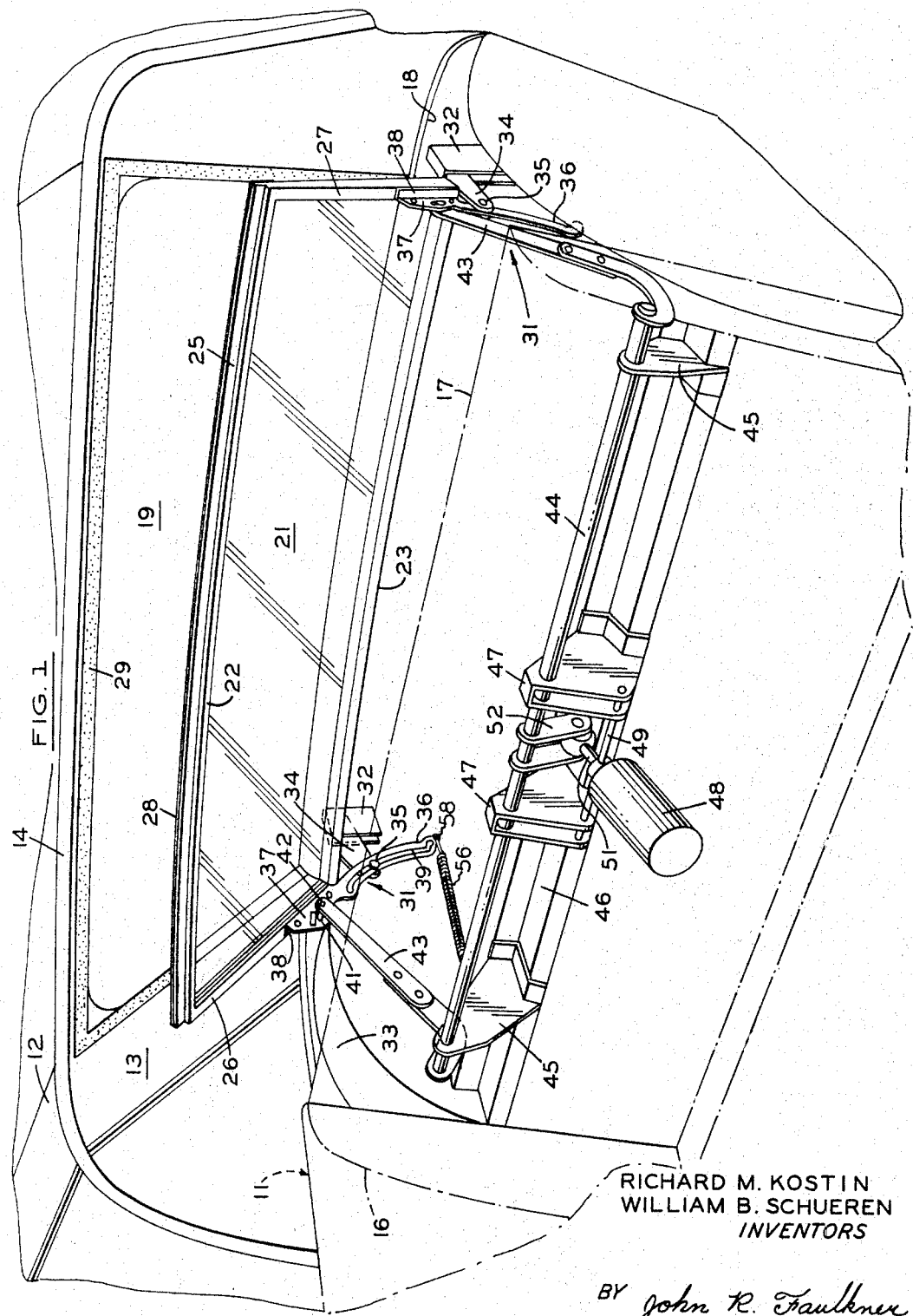
RICHARD M. KOSTIN
WILLIAM B. SCHUEREN
*INVENTORS*
BY *John R. Faulkner*
*John J. Roethel*
*ATTORNEYS*

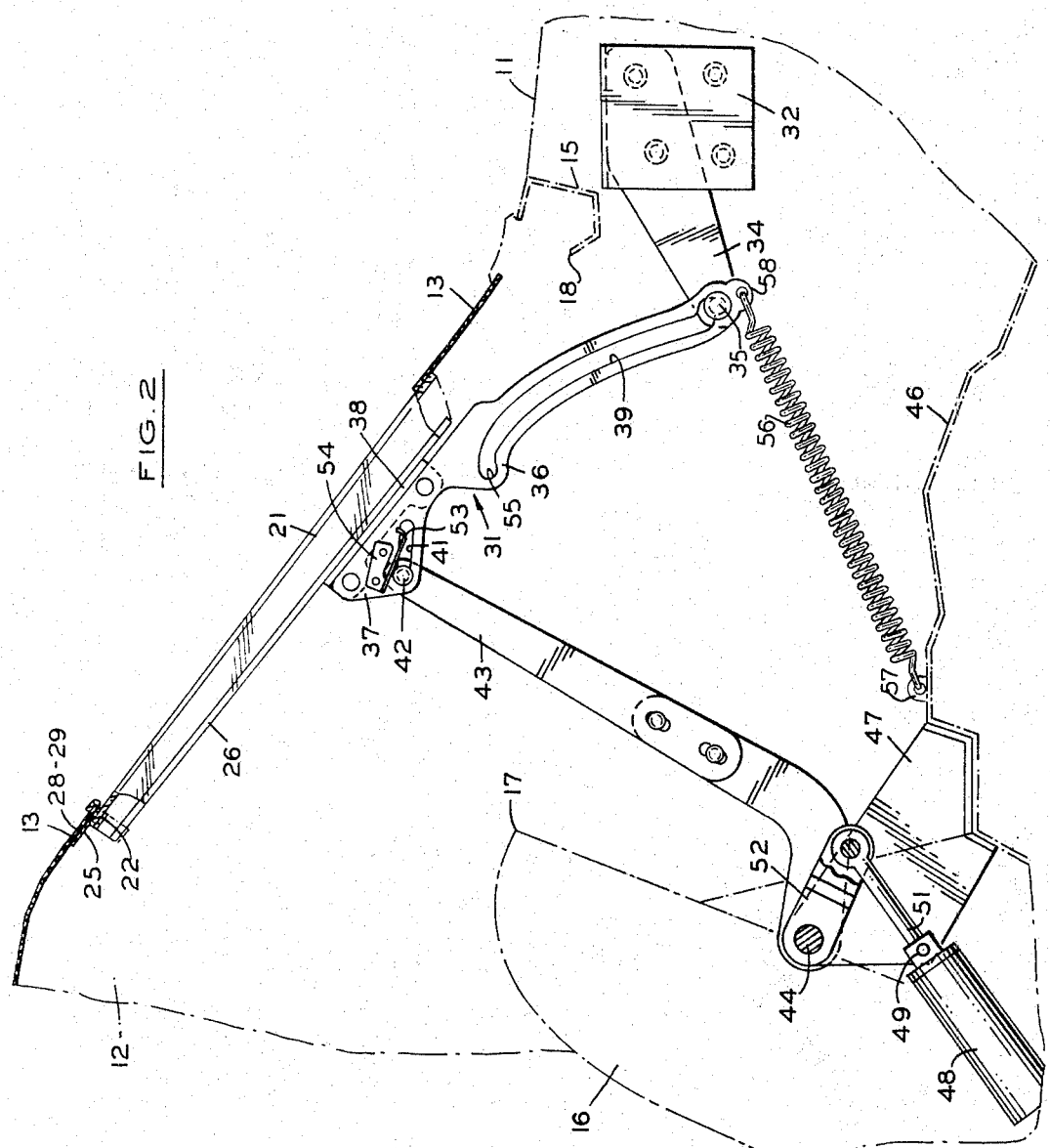

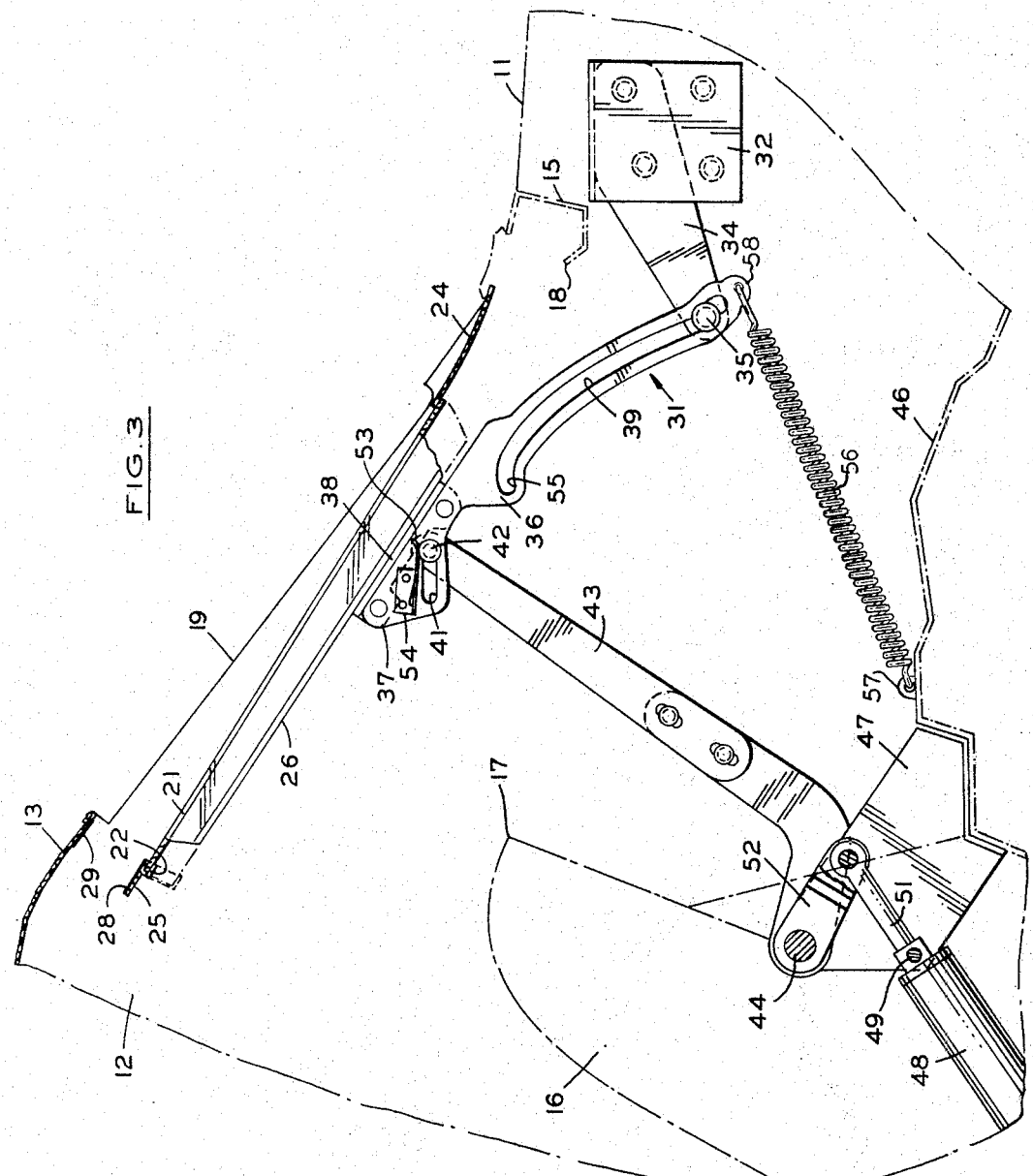

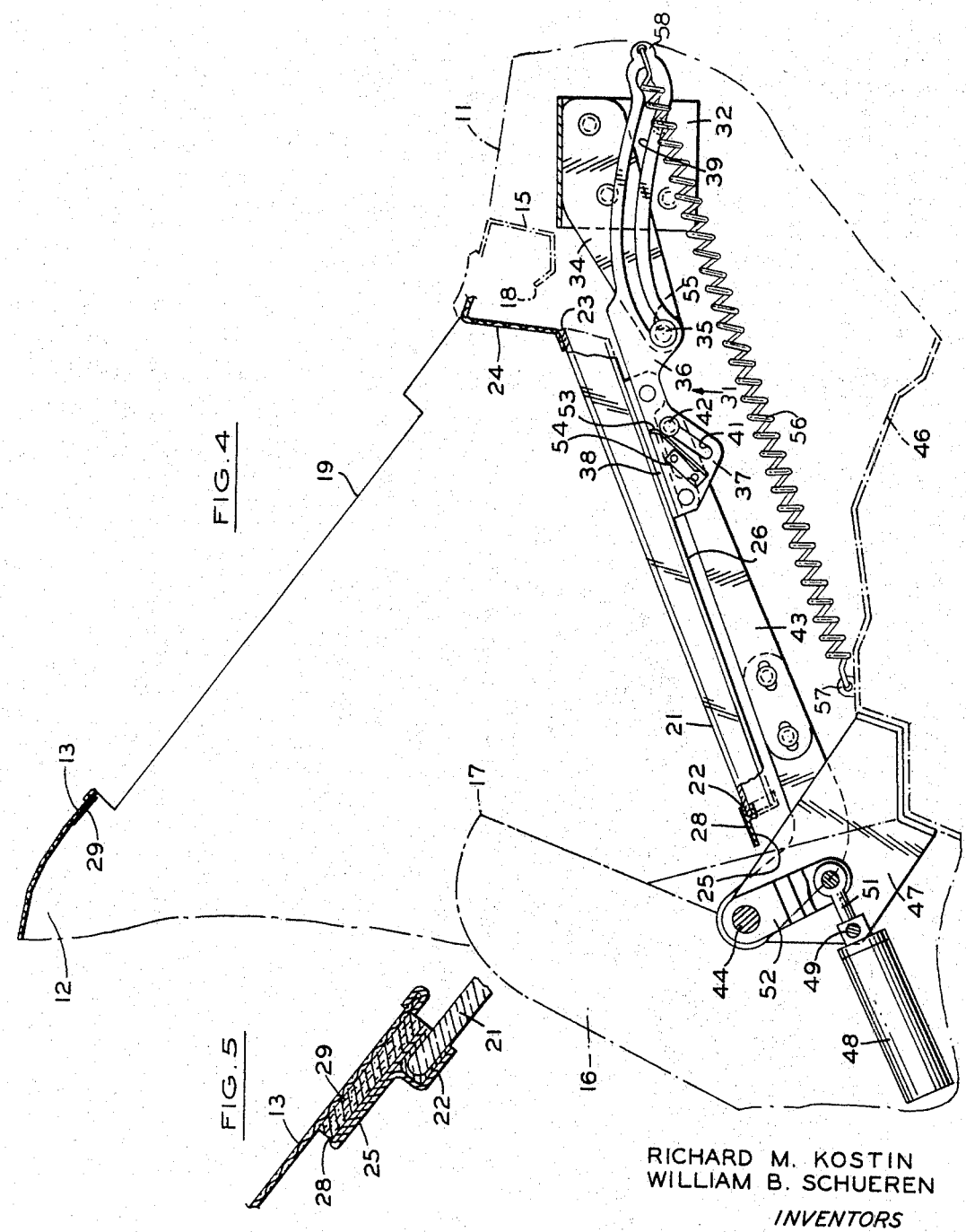

United States Patent Office 3,333,362
Patented Aug. 1, 1967

3,333,362
CONVERTIBLE BACKLIGHT
Richard M. Kostin, Dearborn, and William B. Schueren, Detroit, Mich., assignors to The Ford Motor Company, Dearborn, Mich., a corporation of Delaware
Filed Feb. 5, 1965, Ser. No. 430,617
10 Claims. (Cl. 49—248)

This invention relates to motor vehicles bodies and more particularly to vehicle foldable top structures having independently retractable rear windows.

In the early days of the design of foldable tops for vehicles, large rear window area was not considered important and small glass windows were acceptable. Modern vehicle design requires, however, maximum visibility through all sides of the vehicle body including the rear. This applies equally as well to vehicles having foldable tops as it does to vehicles having "hard tops" or rigid unfoldable top structures. The size of the rear windows required to provide such maximum vision has militated against the use of laminated or tempered glass panels in foldable top structures because laminated or tempered glass panels cannot be flexed or folded to conform to the folding of the foldable top structure into a storage compartment. Accordingly, in recent years plastic or celluloid type windows which could be folded have been used in most foldable top structures.

Although much effort has been extended to develop suitable transparent plastic or celluloid type materials for use as rear windows in vehicle foldable tops, no such material had been found to have characteristics as satisfactory as conventional laminated or tempered glass used in the windshield and side windows of vehicle bodies. Most plastic or celluloid type materials have poor resistance to surface scratches and frequently change from a transparent to a translucent condition after exposure to the elements for a year or more. Recently developed so-called flexible glass panels are an unknown quantity as far as durability and other field service characteristics are concerned and have been found to involve a substantial cost penalty. Accordingly, it is an object of the present invention to provide a solution to the problem of storing a large rigid glass panel in a vehicle body having a foldable top.

Two alternatives appear to present themselves. The storage space for the panel and the top must either be large enough to receive the rear window panel in substantially planar form; or provision must be made for independently retracting the rear window to a storage position prior to the folding of the top. The present invention incorporates the latter approach, i.e., the provision of an independently retractable rear window.

Conventional foldable tops are usually stored in a folded condition in a transversely extending pocket located behind the rear seat and forward of the partition wall separating the passenger compartment from the luggage compartment. To avoid undue encroachment on the passenger compartment, it is desirable to have a storage compartment the width of which longitudinally of the vehicle body is not in excess of that necesary to receive the foldable top. Accordingly, it is a further object of the present invention to provide a nonfoldable rear window that is retractable independently of the foldable top through an opening which does not exceed the space requirements of the top when in folded condition. This is accomplished by mounting the transparent panel for movement along a predetermined path combining both swinging and bodily shiftable movement. In effect, this is accomplished by initially swinging the panel rearwardly and downwardly and then moving the panel in a plane substantially parallel to the plane occupied when in a position closing the rear opening in a foldable top structure in top raised position. When the lower edge of the panel reaches a point below the body frame structure defining the rear edge of the storage compartment for the vehicle top, the panel is rocked to a reversely inclined position beneath the storage compartment. It is subsequently covered by the foldable top as the latter is folded into storage position.

The use of a retractable rear window for a foldable top creates a secondary problem. Some provision must be made for sealing the gap between the window and the top material at the marginal edge of the opening into which the window fits. Conventional foldable top windows are frequently held in sealed relation to the top material by a zipper that extends across the top of the window. The bottom edge of the window is bonded to a piece of the top material forming a flexible hinge and the side edges are held in sealed condition by disengageable sealing means. The present invention embodies a construction and arrangement in which a disengageable sealing means having cooperating portions is interposed between the contiguous marginal edge portions of the window and the top material at the top of the window as well as at the sides. The material is such that the most efficient way of separating the contiguous marginal portions is by a peeling action. Accordingly, the initial swinging movement of the panel causes its top edge to move away from the top edge of the window opening with subsequent disengagement of the sealing means from top to bottom along the side edges. As soon as the top and side marginal edges of the window are separated from the respective top and side marginal edges of the window opening, the panel is then bodily shifted into the storage position as mentioned above.

Other objects, advantages and features of this invention will be made more apparent as this description proceeds, particularly when considered in connection with the accompanying drawings, wherein:

FIG. 1 is an interior perspective view illustrating the construction and arrangement of the retractable window and showing it in partially open position relative to the raised foldable top structure;

FIGS. 2, 3 and 4 are fragmentary side elevational views illustrating the retractable window in a window opening closed position, a partially open or retracted position, and a fully retracted position, respectively; and FIG. 5 is a fragmentary enlarged view illustrating the overlapping relationship of the contiguous marginal portions of the rear window and the top structure with a disengageable sealing means interposed therebetween.

Referring now to the drawing, and particularly to FIG. 1, there is illustrated in outline form a portion of a motor vehicle body 11 having a foldable top. The portion of the top shown is generally designated 12. None of the details of the foldable top structure or the mechanism for folding and unfolding the top is shown since the present invention is adapted to be used with any conventional foldable top for convertible vehicles. The present invention directly involves only the rear fabric panel 13 of the foldable top, i.e., the fabric panel extending downwardly from a rear roof bow 14 to a channel section 15. The channel section 15 may be considered either as defining the rear edge of the passenger compartment or the forward exterior edge of the luggage compartment. In folded or stored condition, the foldable top is dropped into a storage compartment behind the rear seat, the latter being indicated in dot and dash outline at 16. For the purpose of this description, the width of this compartment in a direction longitudinally of the vehicle may be considered as the distance from the rear upper edge 17 of the seat 16 to the forward edge 18 of the channel section 15. In order to avoid undue encroachment upon the passenger compartment area, this storage compartment should be only of a size suitable to receive the folded top structure.

The rear fabric panel 13 of the foldable top 12 has a window opening 19 that extends transversely of the vehicle body. In a conventional convertible top structure, this opening is adapted to be closed by a transparent plastic or celluloid-type window which usually is foldable about a transverse axis as the top folds into the storage compartment. Such plastic or celluloid-type windows are usually held in place in the opening by a releasable fastening means, such as a zipper. When additional ventilation is desired through the rear window opening, it is necessary to unzip the plastic or celluloid-type window so that it may be dropped into the storage compartment independently of the top structure. Many times the instructions for operating the foldable top advise the vehicle operator to manually unzip the rear window so that it may be hand folded before the top structure is mechanically folded. This is because the material may be scratched or permanently creased during the mechanical folding of the top.

In the preferred embodiment of the invention illustrated, the slightly arcuate transparent panel or glass 21 is encased in a lightweight metal frame 22 which extends around all four sides of the glass. At its lower horizontal edge 23, the frame 22 is bonded to a strip of fabric 24 which is secured to a tacking strip (not shown) carried by the channel section 15. At its upper edge 25 and along its side edges 26 and 27 the frame has marginal extensions to which is bonded a pressure sensitive sealing material, indicated at 28. Along the marginal top and side portions of the opening 19 the top fabric also has pressure sensitive sealing material bonded to it, as indicated at 29. When the window 21 and its frame 22 are in closed position, as shown in FIG. 2, the pressure sensitive sealing materials 28 and 29 form a weatherproof joint between the window frame 22 marginal portions and the top fabric window opening 19 marginal portions.

(A pressure sensitive material particularly adapted for this application is known by the trade name "Velcro." When two pieces of "Velcro" pile are pressed together, the upstanding fibers of the material interlock and it requires a pealing action to separate the two pieces.)

The transparent panel or window 21 is movable out of and into the window opening 19 by a panel supporting and movement controlling mechanism. The components of the supporting and controlling mechanism are located beneath the side of the opening, and they may be considered as two similar or symmetrical units each generally designated 31. Each unit 31 comprises a support bracket 32 supported on the vehicle body, either on the interior of the rear quarter panel rearwardly of the wheel housing diagrammatically illustrated at 33 or on the floor of the luggage compartment, depending on space availability. The support bracket 32 carries a forwardly extending arm 34 having at its terminal end a laterally extending guide pin or stud 35.

The guide pin 35 is coupled to a cam arm or guide track member 36 which is bolted at one end 37 to a support plate or bracket 38. The support plate or bracket 38 is spot welded to the vertical frame member of the window frame 22. The cam arm or guide track member 36 has two slots therein. Most noticeable is the elongated curved slot 39 through which the guide pin 35 projects. Forward of the slot 39 is a short straight slot 41 which lies at an angle to the plane of the panel 21. In closed position of the panel 21, the slot 41 extends in a substantially horizonal direction relative to the horizontal plane of the vehicle body.

The slot 41 receives a stud or pin 42 carried on the end of a power link or arm 43. The link or arm 43 is coupled to one end of a shaft 44 that extends transversely of the vehicle body. The shaft 44 is supported at each of its ends on suitable support brackets 45 secured to the vehicle body floor, as indicated at 46. The shaft 44 is thus common to both of the supporting and movement controlling units 31.

The shaft 44 is also supported intermediate its ends by a pair of spaced support brackets 47. A hydraulic power cylinder 48 suspended from trunnions 49 at its upper end has its piston rod 51 coupled to the lower end of a crank arm 52 depending from the shaft 44.

One final detail of construction should be noted. Immediately above each slot 41 in the end 37 of the cam arm or guide track 46 there is a detent spring 53. The detent spring 53 is mounted on a bracket 54 secured to the end portion of the cam arm or guide track 37. The detent spring 53 substantially parallels the slot 41 and functions as an antirattler applying pressure to the stud 42 connecting the power link 43 to the cam arm or guide track member 36.

Referring now to FIGS. 2, 3 and 4, there is illustrated the sequential displacement of the parts as the panel 21 is moved from the fully closed position (see FIG. 2) to a fully retracted position (see FIG. 4).

In FIG. 2, the fully closed position of the panel 21, the power links 43 extend in a direction substantially normal to the plane of the glass panel 21. The studs 42 on the ends of the power links 43 are at the left ends of the respective slots 41 in the cam arm or guide track members 36. The guide pins 35 carried on the arms 34 are at the lower ends of the slots 39 in the respective cam arm or guide track members 36.

Upon power being applied to the hydraulic cylinder 48 to cause the piston rod 51 of the latter to be retracted, the power links 43 will be swung in a clockwise direction as viewed in the drawings. Since the studs 42 on the ends of the power links 43 are travelling in substantially horizontal slots 41, there is imparted to the panel 21 a swinging movement about the transverse pivot axis defined by the pins or studs 35 carried on the ends of the support arms 34. This is important because this provides a peeling action separating the disengageable weatherstrip components 28 and 29 around the upper edge and the side edges of the panel 21. It is believed readily apparent that any attempt to move the panel 21 in a direction normal to the plane of the window opening would require the application of excessive force to break away the coacting portions of the disengageable sealing means 28–29. The peeling separation occasioned by swinging the panel 21 about the pivot axis defined by the studs or pin 35 causes the frame 22 to be separated from the marginal edge portions of the top fabric upon a relatively minor application of force.

The length of the slot 41 is such that the separation of the marginal edge portions of the frame 22 of the panel 21 from the marginal edge portions of the fabric top around the window opening 19 occurs in timed relationship to the arrival of the stud 42 on the end of the power links 43 at the end of the slot 41. Further movement of the arms 43 in clockwise direction is thus transmitted by the studs 42 to the cam arms or guide track members 36. This results in the panel 21 being bodily shifted downward to the extent permitted by the length of the slot 39 in the cam arm or guide track members 36 relative to the transverse axis defined by the guide studs or pins 35. This downward shifting movement continues until the ends of the slots 39 are reached, or until the studs 35 are seated at the ends 55 of the slots 39 (see FIG. 4). When this position is reached, further swinging movement of the power links 43 in a clockwise direction again results in the panel 21 being swung about a transverse axis defined by the guide studs or pins 35. This swinging movement continues until the panel 21 is in substantially parallel relationship to the power links 43. It will be understood that restoration of the panel 21 from its FIG. 4 position to its FIG. 2 position will follow a reverse sequence of events.

Movement of the panel 21 into and out of its storage position is stabilized and coordinated by counterbalance assist springs 56 located at each side of the panel 21.

The springs 56 extend from brackets 57 anchored to the vehicle floor 46 to extensions 58 of the lower ends of the cam arm or guide track members 36. When the panel 21 is in its closed (FIG. 2) or substantially closed (FIG. 3) positions, the springs 56 are under very little tension. This low tension condition is maintained until the panel 21 and the low cam arms 36 have been dropped to a position in which the slot ends 55 coact with the guide pins 35 to provide the pivot axis about which the window panel is swung into a stored position. As the window panel 21 is swung about the pivot axis 35, the spring 56 is placed under increased tension until the position shown in FIG. 4 is released whereupon it reaches maximum tension. The effect of this is that the window weight is counterbalanced as the window is swung downwardly into a stored position and the spring is stressed. When it is desired to raise the window, the spring will materially assist in swinging the panel about the pivot axis defined by the pivot pins 35. When the window is rotated to a position substantially parallel to the plane of the window opening 19, the spring has little effect or resistance to the upward movement of the window panel into closed position relative to the window opening.

It is obvious from an examination of the drawings and the foregoing description, that the panel 21 could not be swung from its FIG. 2 position to its FIG. 4 position about a single pivot axis since movement of the panel would be blocked by the rear edge portion 17 of the seat 16. In order to avoid such interference it would be necessary to unduly enlarge the space between the edges 17 and 18 by moving the seat forward thereby encroaching on the usable space of the passenger compartment or by moving the window structure rearwardly thereby encroaching on the space available for the luggage compartment. The construction and arrangement above described permits the window panel 21 to be dropped down into a storage space having an opening narrower than the width of the panel and then to be swung away into a stored position. This leaves plenty of room for the foldable top to be folded above the panel 21 into the space between the rear seat and the channel 15 defined in the forward edge of the luggage compartment.

It will be understood that the invention is not to be limited to the exact construction shown and described, but that various changes and modifications may be made without departing from the spirit and scope of the invention, as defined in the appended claims.

We claim:

1. A retractable window for an opening in and extending transversely of a vehicle body, comprising:
a transparent panel adapted to close said opening from the inside of said vehicle body,
guide means supported on said vehicle body,
track means fixed to said panel and coupled to said guide means,
power link means coupled to said track means,
said power link means, track means and guide means being constructed and arranged so that actuation of the power link means first pivotally swings said panel about a pivot axis extending transversely of the vehicle body from a position closing said body opening to a partially open position inwardly of said vehicle body and then subsequently bodily shifts said panel relative to said pivot axis from said partially opened to a fully opened position substantially beneath said opening,
and reversible power means for driving said power link means.

2. In a vehicle body,
a top structure having a transversely extending rear window opening,
a transparent panel coextensive with said opening and having marginal edge portions overlapping contiguous marginal edge portions of said top structure around said opening,
disengageable sealing means interposed between said overlapping marginal edge portions,
guide means supported on said body,
track means fixed to said panel and coupled to said guide means,
power link means supported on said body and coupled to said track means,
and means carried on said body to actuate said power link means,
said power link means, track means and guide means being constructed and arranged so that actuation of the power link means when said transparent panel is in opening closed position swings said panel about a pivot axis extending transversely of the body,
such swinging movement causing progressive disengagement of said disengageable sealing means, and
further actuation of said power link means after disengagement of said sealing means bodily shifting said panel to a fully retracted position within said body.

3. In a vehicle body according to claim 2, in which:
the power link means includes a pair of links extending in a direction substantially normal to the plane of the transparent panel when the latter is in opening closed position,
said panel and said pair of links lying in substantially parallel relationship to each other in fully retracted position of the panel.

4. In a vehicle body,
a top structure having a transversely extending rear window opening,
a transparent panel coextensive with said opening and having marginal edge portions overlapping contiguous marginal edge portions of said top structure around said opening,
disengageable sealing means interposed between said overlapping marginal edge portions,
a guide member supported on said body beneath each side edge of said panel,
a track member fixed to each side edge of said panel and coupled to said guide member,
a power link supported on said body beneath each side edge of said panel and coupled to the track member thereabove,
and power means carried on said body to actuate said power links,
said power links, track members, and guide members being constructed and arranged so that actuation of the power links when said panel is in opening closed position swings said panel about a pivot axis extending transversely of the body,
such swinging movement causing progressive disengagement of said disengageable sealing means, and
further actuation of said power links after disengagement of said sealing means bodily shifting said panel to a fully retracted position within said body.

5. In a vehicle body according to claim 4, in which:
each power link extends in a direction substantially normal to the plane of the transparent panel when the latter is in opening closed position,
said panel and said power links lying in substantially parallel relationship to each other in fully retracted position of the panel.

6. In a vehicle body,
a top structure having a transversely extending rear window opening,
a transparent panel coextensive with said opening,
a guide member supported on said body beneath each side edge of said panel,
a track member fixed to each side edge of said panel having a pin and slot connection with a respective guide member,
a power link supported on said body beneath each side edge of said panel and having a pin and slot connection with the respective track member thereabove,
said power links upon being actuated to move said panel from a closed position to a retracted position coacting with said track members through the pin and slot connections therebetween to swing said panel about a transverse axis defined by the pins of the pin and slot connections between the track members and guide members to a predetermined opened position, said power links after said predetermined open position is reached then driving said track members along said guide means and bodily shifting said panel and track members to a fully retracted position of said panel.

7. In a vehicle body, a top structure having a transversely extending rear window opening, a transparent panel coextensive with said opening and having marginal edge portions overlapping contiguous marginal edge portions of said top structure around said opening, disengageable sealing means interposed between said overlapping marginal edge portions, a guide member supported on said body beneath each side edge of said panel, a track member fixed to each side edge of said panel having a pin and slot connection with a respective guide member, a power link supported on said body beneath each side edge of said panel and having a pin and slot connection with the respective track member thereabove, and power means carried on said body to actuate said power links, said power links upon being actuated to move said panel from a closed position to a retracted position coacting with said track members through the pin and slot connections therebetween to first swing said panel about a transverse axis defined by the pins of the pin and slot connections between the track members and guide members, such swinging movement causing progressive disengagement of said disengageable sealing means, said power links after complete disengagement of said sealing means then driving said track members relative to said guide means and bodily shifting said panel and track members to a fully retracted position of said panel.

8. In a vehicle body according to claim 7, in which:

each power link extends in a direction substantially normal to the plane of the transparent panel when the latter is in opening closed position, said panel and said power links lying in substantially parallel relationship to each other in fully retracted position of the panel.

9. In a vehicle body according to claim 8, in which:

the power means comprises a shaft extending transversely of the vehicle body, each of the power links being coupled to said shaft at an end of the latter, a crank arm coupled to said shaft intermediate the ends thereof, and a power unit coupled to said crank arm for rotating said shaft and thereby swinging said power links.

10. In a vehicle body according to claim 7, in which:

the power means comprises a shaft extending transversely of the vehicle body, each of the power links being coupled to said shaft at an end of the latter, a crank arm coupled to said shaft intermediate the ends thereof, and a power unit coupled to said crank arm for rotating said shaft and thereby swinging said power links.

References Cited

UNITED STATES PATENTS 2,762,648  9/1956  Huzzard _____ 296—146 X
3,236,557  2/1966  Podolan _____ 49—249 X

FOREIGN PATENTS 1,146,767  4/1963  Germany.

DAVID J. WILLIAMOWSKY, *Primary Examiner.*

HARRISON R. MOSELEY, *Examiner.*

J. K. BELL, *Assistant Examiner.*